(12) United States Patent
Dahl et al.

(10) Patent No.: US 7,658,235 B2
(45) Date of Patent: Feb. 9, 2010

(54) THREE-POINT HITCH FOR UTILITY VEHICLE

(75) Inventors: Jeffrey A. Dahl, Bismarck, ND (US); Thomas J. Tokach, Mandan, ND (US); Jason Webster, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 11/836,107

(22) Filed: Aug. 8, 2007

(65) Prior Publication Data

US 2008/0035356 A1    Feb. 14, 2008

Related U.S. Application Data

(60) Provisional application No. 60/821,732, filed on Aug. 8, 2006.

(51) Int. Cl.
*A01B 59/043* (2006.01)

(52) U.S. Cl. .................... 172/449; 172/501

(58) Field of Classification Search ......... 172/439–451, 172/501, 502, 414
See application file for complete search history.

(56) References Cited

U.S. PATENT DOCUMENTS

| | | | | |
|---|---|---|---|---|
| 1,833,878 A * | 11/1931 | Adams | ........................ | 172/199 |
| 2,143,889 A | 1/1939 | Ledwinka | | |
| 2,175,528 A | 10/1939 | Klavik | | |
| 3,056,458 A * | 10/1962 | Gray | ........................ | 172/448 |
| 3,357,720 A * | 12/1967 | Kulhavy et. al. | ............ | 280/474 |
| 3,386,518 A * | 6/1968 | Mellen | ........................ | 172/225 |
| 3,654,749 A * | 4/1972 | Ostergren et al. | ............ | 56/15.8 |
| 4,085,815 A | 4/1978 | Miller | | |
| 4,252,198 A * | 2/1981 | Formhals | ........................ | 172/833 |
| 4,357,031 A * | 11/1982 | Berg | ........................ | 172/439 |
| 5,423,394 A * | 6/1995 | Kendle | ........................ | 180/53.3 |
| 5,771,980 A * | 6/1998 | Mork | ........................ | 172/501 |
| D406,594 S | 3/1999 | Miller et al. | | |
| D500,056 S | 12/2004 | DeYoung et al. | | |
| 6,915,862 B2 * | 7/2005 | Deves et al. | ................. | 172/448 |
| D508,499 S | 8/2005 | Kurtz, Jr. | | |
| 7,108,475 B1 | 9/2006 | Gustafson | | |
| 2004/0140109 A1 * | 7/2004 | Schlesser et al. | ............ | 172/439 |
| 2004/0262061 A1 | 12/2004 | Bahr et al. | | |
| 2005/0279548 A1 | 12/2005 | Kurtz, Jr. et al. | | |

OTHER PUBLICATIONS

International Search Report and Written Opinion of the International Searching Authority from foreign application PCT/US07/75525, filed Aug. 8, 2007.

* cited by examiner

*Primary Examiner*—Robert E Pezzuto
*Assistant Examiner*—Matthew D Troutman
(74) *Attorney, Agent, or Firm*—Leanne Taveggia Farrell; Westman, Champlin & Kelly, P.A.

(57) ABSTRACT

A three-point hitch assembly is removeably attachable to a rear interface mount on a utility vehicle. The three-point hitch assembly includes a rock shaft, an actuator, an actuator arm and a float mechanism. The actuator arm is fixed to the actuator at a first end and rotatably coupled to the rock shaft at a second end. The float mechanism includes a float block fixed along the rock shaft and positioned adjacent the actuator arm.

20 Claims, 14 Drawing Sheets

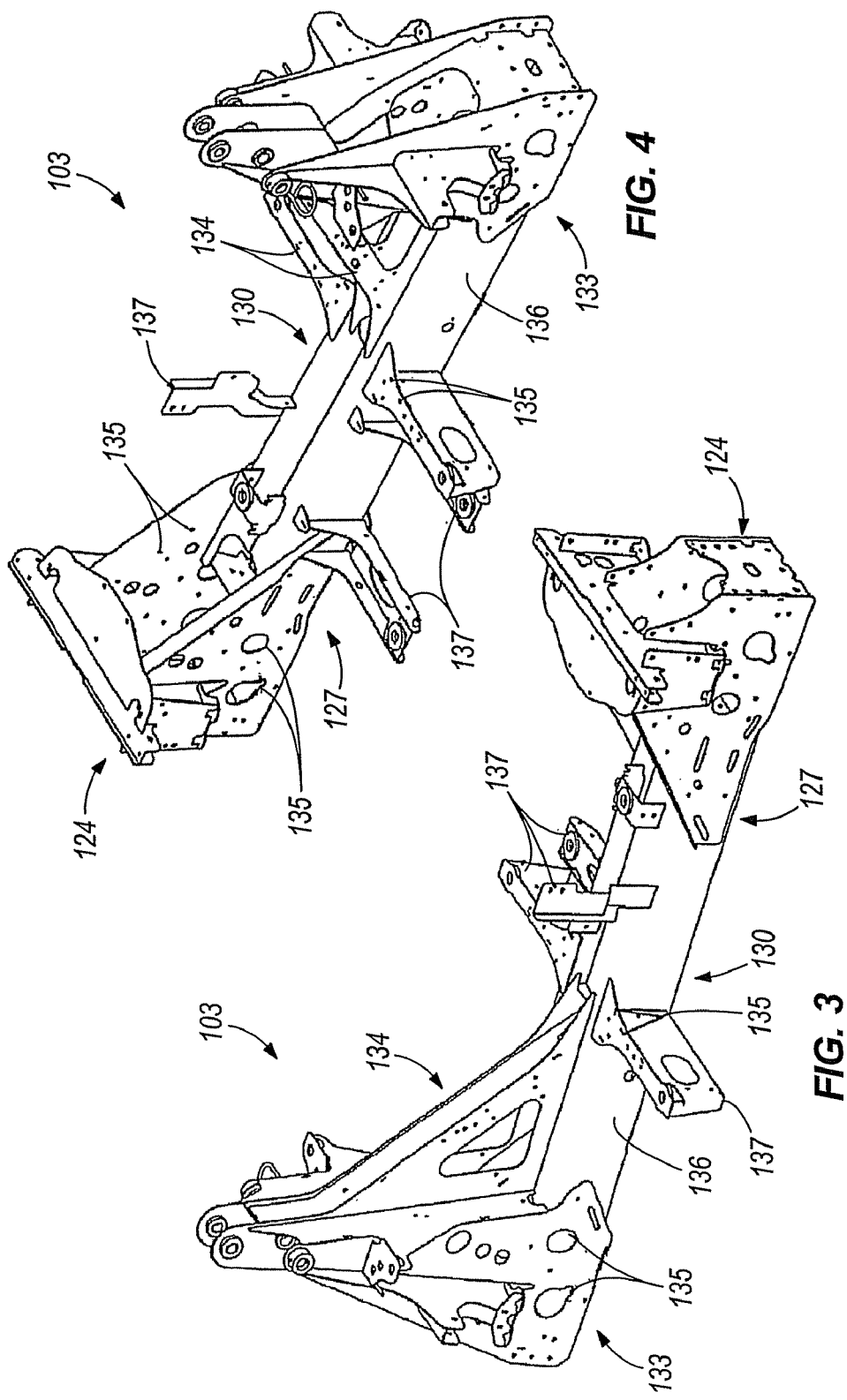

THREE-POINT HITCH FOR UTILITY VEHICLE

RELATED APPLICATIONS

This application claims the benefit of provisional U.S. patent application Ser. No. 60/821,732 filed on Aug. 8, 2006, the entire disclosure of which is incorporated herein by reference.

FIELD OF THE INVENTION

The present invention relates to a self-propelled work vehicle.

SUMMARY

In one embodiment, the invention provides a utility vehicle including a frame, front and rear wheel assemblies supporting the frame and an operator compartment supported on the frame and having operator controls. An engine is supported on the frame for providing power to the front and rear wheel assemblies, and a cooling assembly is mounted above the engine. The utility vehicle also includes an attachment arm attached to a front portion of the frame and a rear interface mount rigidly attached to a rear portion of the frame. The rear interface mount has a plurality of interface apertures adapted for accommodating attachment of one or more of a plurality of work mechanisms to the rear interface mount. The rear interface mount can accommodate the interfaces of work mechanisms in which the interface of a first work mechanism is different from an interface of a second work mechanism. The frame includes a central, tubular frame member having a front end portion and a rear end portion.

In another embodiment the invention provides a three-point hitch assembly for a utility vehicle including an upper link, a pair of lift arms, a pair of lower links coupled to the lift arms, a rock shaft connecting the lift arms, a hydraulic cylinder and an actuator arm coupling the hydraulic cylinder to the rock shaft for transferring a lifting force from the hydraulic cylinder to the rock shaft. The three-point hitch assembly further includes a float mechanism for inhibiting a transfer of force from the rock shaft to the hydraulic cylinder. The float mechanism includes a float block fixed to the rock shaft. The float mechanism includes a slot in one of the float block and the actuator arm and a protrusion in the other of the float block and the actuator arm. The protrusion is rotatable within the slot to permit rotation of the rock shaft relative to the actuator arm.

Other aspects of the invention will become apparent by consideration of the detailed description and accompanying drawings.

BRIEF DESCRIPTION OF THE DRAWINGS

FIG. 3 illustrates a perspective view of a portion of the frame according to an embodiment of the invention.

FIG. 4 illustrates another perspective view of the frame of FIG. 3.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
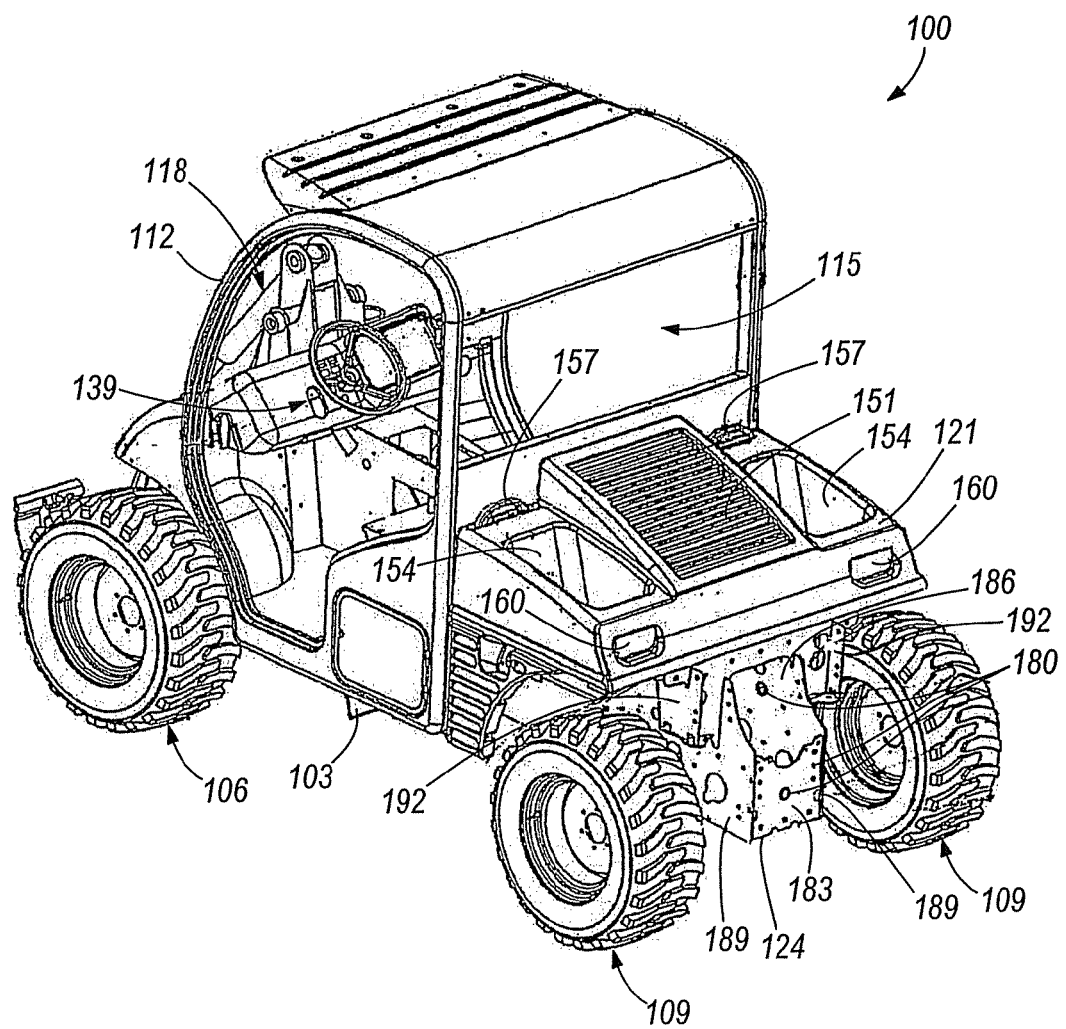
FIG. 1 illustrates a perspective view of a utility vehicle according to an embodiment of the invention.

FIG. 1 illustrates a utility vehicle 100 according to an embodiment of the invention. The utility vehicle 100 includes a frame 103 supported with front and rear wheel assemblies 106, 109. The frame 103 is attached to a cab 112 that forms an operator compartment 115. The utility vehicle 100 includes an engine 116 (see FIG. 5) for driving operation of the vehicle 100. The engine 116 can be an internal combustion engine, but can also be a hydraulic engine, a steam engine, etc. The engine 116 is disposed between the cab 112 and the rear wheel assembly 109 and is attached to the frame 103. The utility vehicle 100 further includes an attachment arm assembly 118 positioned in front of the cab 112 that is attached to a front portion of the frame 103. The utility vehicle 100 also includes a rear cover 121 and a rear interface mount 124.

Figure 2:
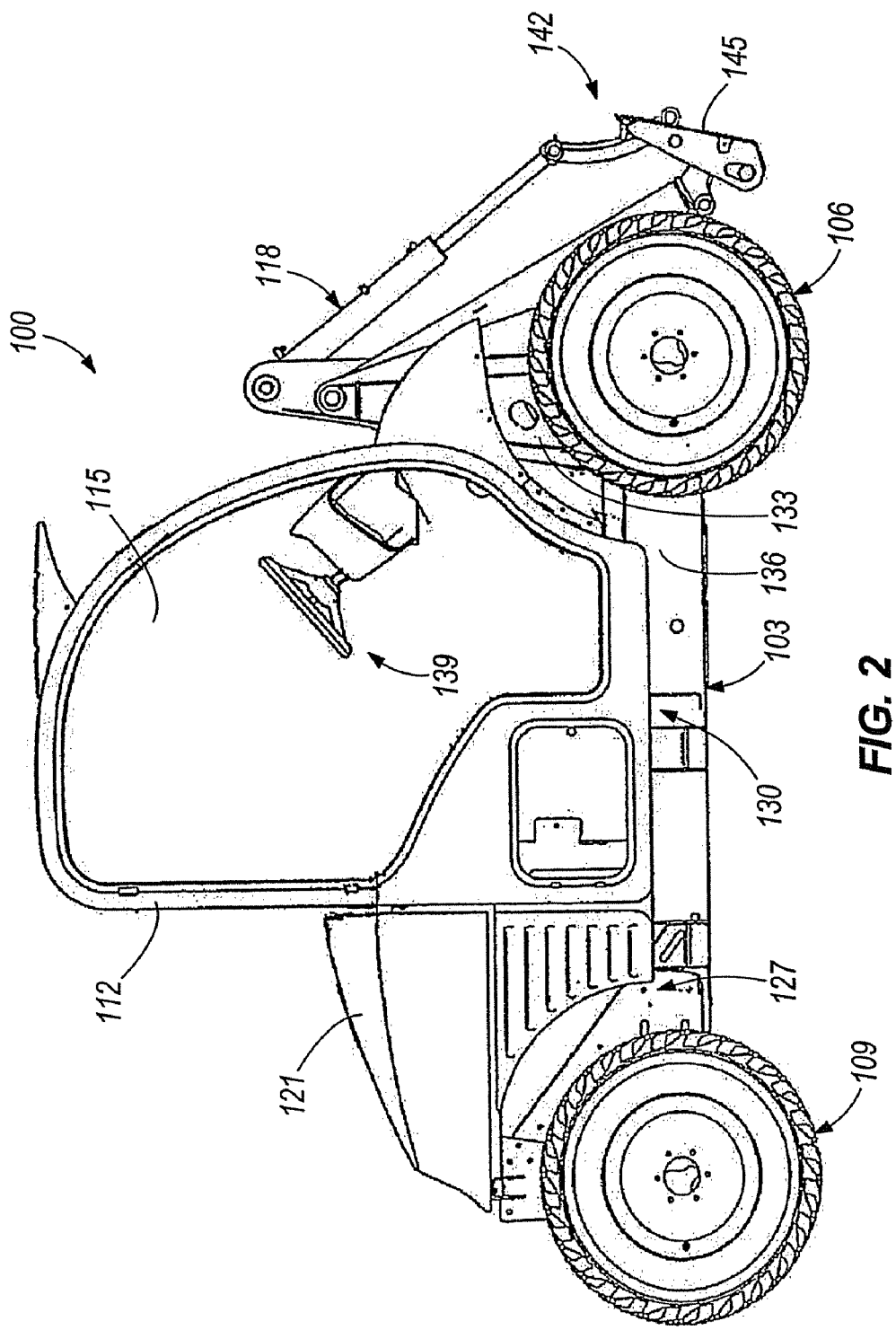
FIG. 2 illustrates a right side view of the utility vehicle of FIG. 1.

FIG. 2 is a right side view of the utility vehicle 100. The frame 103 is a rigid frame assembly that lacks frame articulation between the front and rear wheel assemblies 106, 109. FIGS. 3 and 4 show a portion of the frame 103. The frame 103 includes an engine support portion 127, a middle portion 130 for supporting the cab 112, and an attachment arm support portion 133. The middle portion 130 is adapted to provide a stable mount for the cab 112 and can be adapted to accommodate an engine mounted longitudinally or transversely with respect to the frame 103.

The attachment arm support portion 133 includes a central, tubular member 136 extending transversely underneath the cab 112. The tubular member 136 can have a rectangular cross-sectional shape. A front portion of the beam 136 forms the attachment arm support portion 133 while a rear portion of the beam 136 forms the middle portion 130 and the engine support portion 127. The attachment arm support portion 133 and the engine support portion 127 can be integrally formed with the tubular member 136 or can be welded or otherwise rigidly attached to the tubular member 136. The attachment arm support portion 133 is strengthened to resist bending or twisting from loads carried with the attachment arm assembly 118. A brace member 134 is attached to the tubular member 136 and provides additional support for the attachment arm support portion 133. The rear interface mount 124 is rigidly attached to a rear portion of the tubular member 136. The frame 103 further includes various frame interface apertures 135 on the attachment arm support portion 133, the middle portion 130 and the engine support portion 127. The frame interface apertures 135 can have various diameters for receiving bolts or other connecting members for mounting the operator cab 112, engine 116, front and rear wheel assemblies 106, 109, etc. to the frame 103. The interface apertures 135 are arranged to facilitate attaching components having varying configurations and different types of components. In this manner, the frame 103 is capable of providing a support platform for utility vehicles having varying configurations. The frame 103 further includes secondary frame support members 137 of various configurations for facilitating attachment to different utility vehicle components. The secondary frame support members 137 can be integrally formed, welded, or otherwise fixed to the tubular frame member 136.

Returning to FIG. 2, the attachment arm assembly 118 is mounted to the attachment arm support portion 133 of the frame 103. The attachment arm assembly 118 is coupled to the frame 103 such that the attachment arm assembly 118 can be moved relative to the frame 103. Movement of the attachment arm assembly 118 can be controlled through the operator controls 139 located in the operator compartment 115 and can be powered through the use of hydraulic actuators or other types of electrical or mechanical actuators that receive power from the engine.

A remote or working end 142 of the attachment arm assembly 118 can be connected to a front arm interface plate 145 that provides an interface for attaching to various tools. Such tools can include, for example, blades, buckets, grapples, brooms, augers, pallet forks, etc. (none shown). The front arm interface plate 145 can provide an interface as is disclosed in U.S. Pat. No. 5,562,397, the entire contents of which are hereby incorporated herein by reference.

Figure 5:
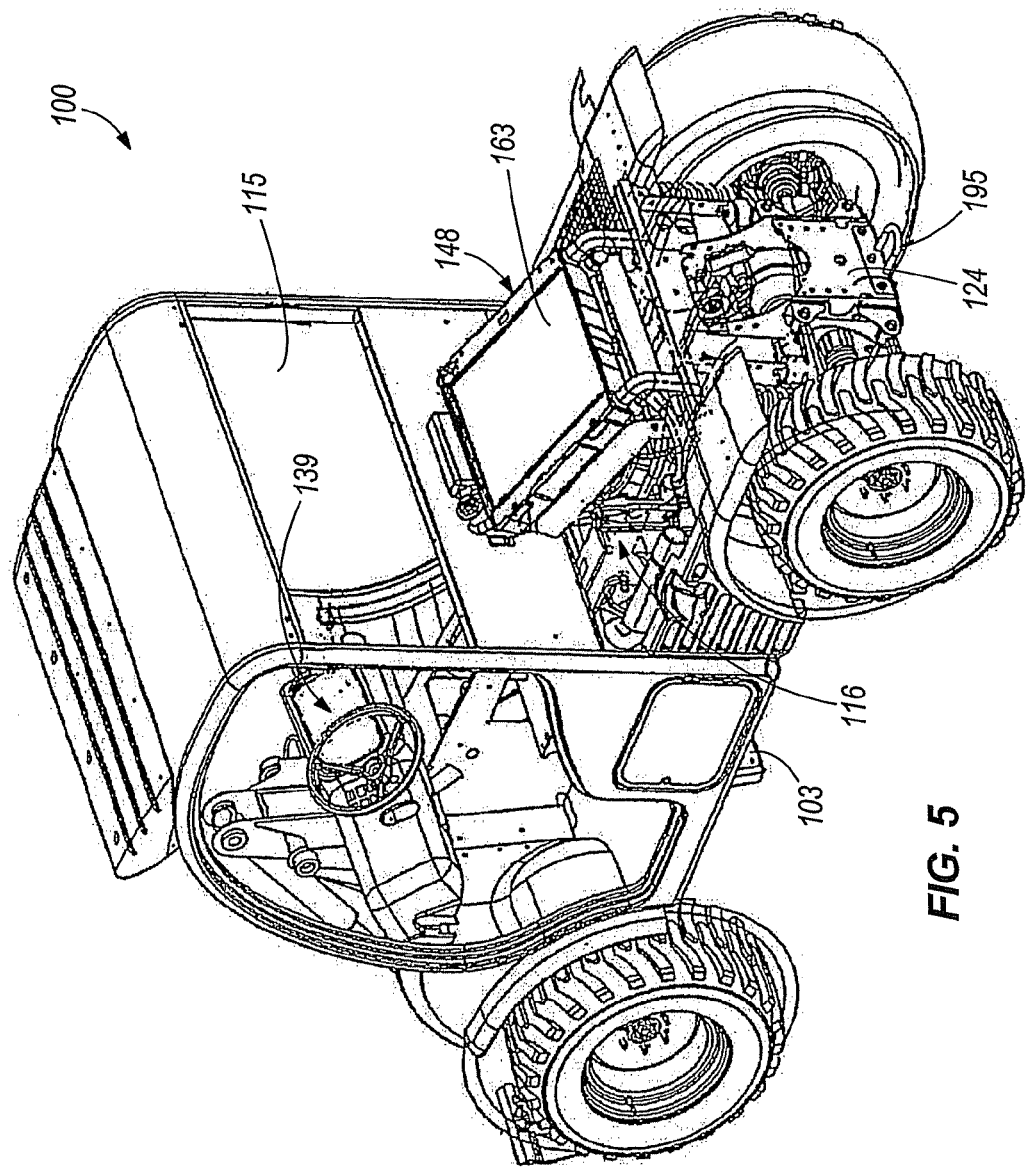
FIG. 5 illustrates a perspective view of the utility vehicle of FIG. 1 with the rear cover removed.

FIG. 5 shows the engine 116, which can provide power to either or both of the front and rear wheel assemblies 106, 109 to move the utility vehicle 100. The engine 116 is connected to one or both of the front and rear wheel assemblies 106, 109 with mechanical drives, hydraulic motors or other suitable devices for power transmission. The front and rear wheel assemblies 106, 109 can include suspension systems coupled to the frame 103. A steering linkage can be coupled to either or both of the front and rear wheel assemblies 106, 109. Controls 139 for operation of the utility vehicle 100 are located in the operator compartment 115.

The utility vehicle 100 further includes a cooling assembly 148 (see FIGS. 5-8) that is covered by the rear cover 121. FIGS. 1 and 8 show the rear cover 121, which includes a radiator screen 151 for permitting air flow therethrough. Although the radiator screen 151 is illustrated as having a plurality of linear slats, it should be understood that the radiator screen 151 can be configured in various ways as long as the radiator screen 151 can be used as an exhaust for the cooling assembly 148. The rear cover 121 also includes a pair of containers 154 formed integrally with the rear cover 121, a pair of handles 157 and a pair of tail lights 160. The handles 157 are adapted for use in at least partially removing or lifting the rear cover 121 to access the components located beneath, such as the cooling assembly 148 and/or the engine. The rear cover 121 can be fully detachable from the utility vehicle 100, or can be movably attached to the utility vehicle 100 so as to be pivotable or otherwise movable from a closed, covering orientation, as illustrated in FIG. 1, to an open, uncovered orientation (not shown) without being fully detached from the utility vehicle 100. The rear cover 121 can be lifted or otherwise moved away from the utility vehicle 100 at a front, rear or side portion.

In the illustrated embodiment, the radiator screen 151 is integral with the containers 154. In other embodiments, the rear cover 121 includes one or more cover portions that can be coupled to one another or independently mounted to the utility vehicle 100. For example, a center portion of the rear cover 121 can be separate from side portions to allow the radiator screen 151 to be lifted for access underneath without disturbing the containers 154.

In the illustrated embodiment, the radiator screen 151 is approximately centered on the rear cover 121 so that one of the pair of containers 154 is positioned on each side. In other embodiments, the radiator screen 151 can be closer to one side of the rear cover 121 and both or all of the containers 154 can be on the same side of the radiator screen 151.

The containers 154 can be utilized to carry various objects. For example, the containers 154 can carry various work tools, devices and supplies for various kinds of work applications. The containers 154 can have various dimensions and inner geometry. For example, the containers 154 can be shaped to carry a five gallon bucket, a tool box, etc.

Figure 6:
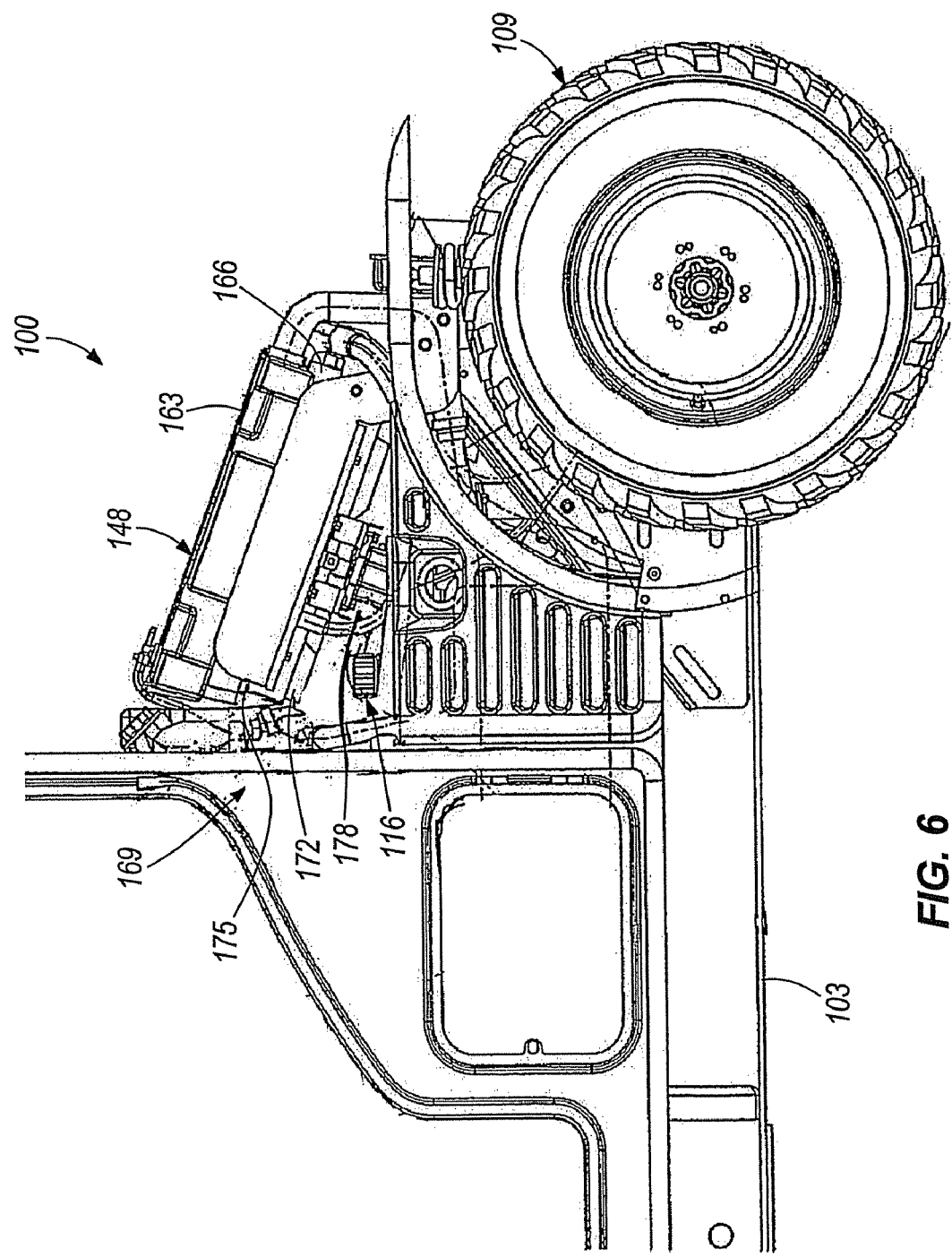
FIG. 6 illustrates a side view of the utility vehicle of FIG. 5.

FIGS. 5 and 6 illustrate the utility vehicle 100 with the rear 121 cover removed to illustrate the engine 116 and the cooling assembly 148. The cooling assembly 148 is positioned above the engine and includes a radiator 163, a hydraulic oil cooler 166 and a hydraulic fan assembly 169. By positioning the cooling assembly 148 at least partially above the engine 116, the utility vehicle 100 can be compact and stable.

Figure 7:
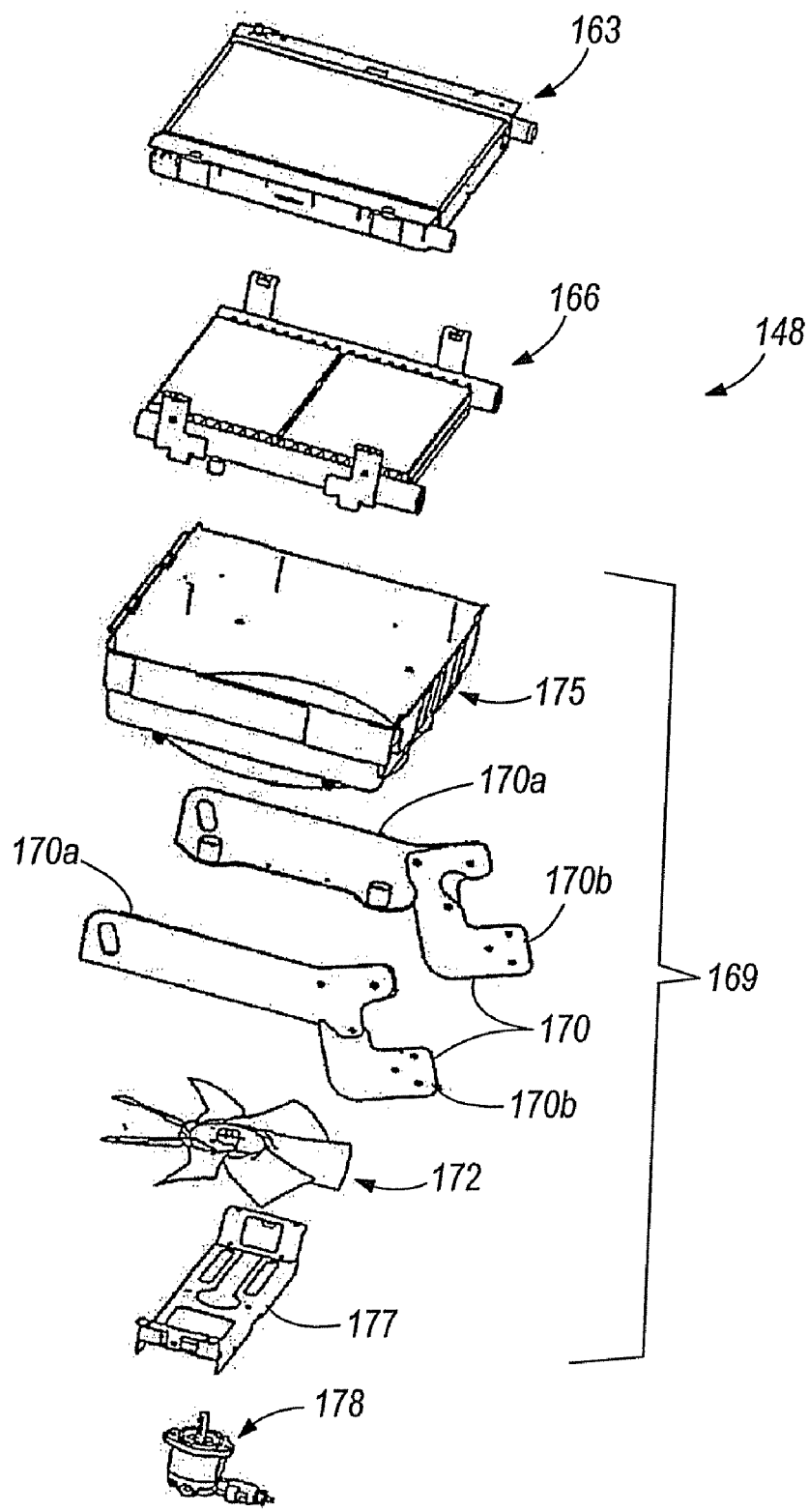
FIG. 7 illustrates an exploded view of the cooling assembly according to an embodiment of the invention.
Figure 8:
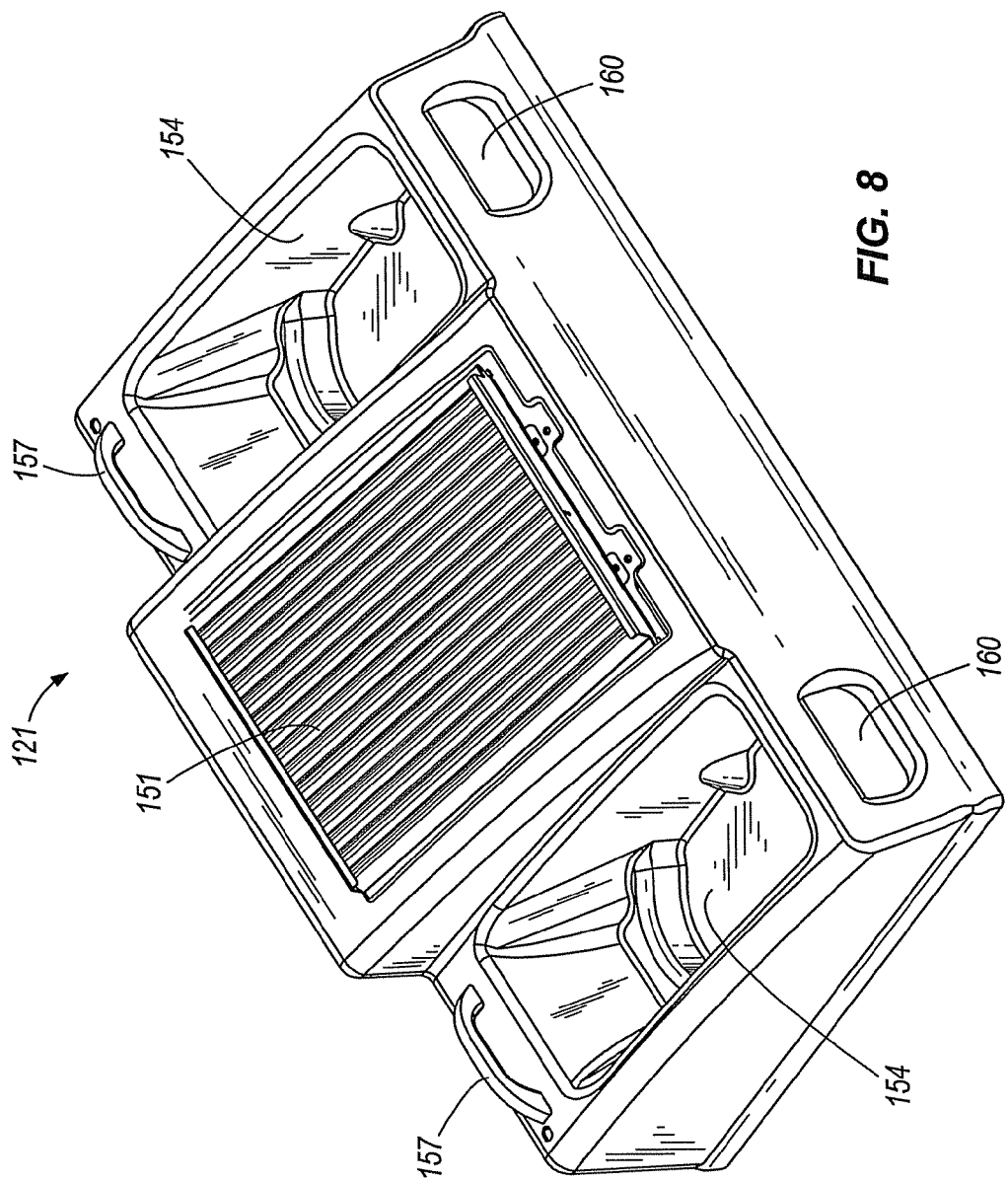
FIG. 8 illustrates a perspective view of the rear cover according to an embodiment of the invention.

FIG. 7 shows the cooling assembly 148. The radiator 163 includes cooling elements and is adapted to cool engine coolant that is continuously circulated through the engine 116. As illustrated in FIGS. 3 and 4, the radiator 163 is oriented at an angle from a horizontal axis of the frame 103 or the ground to exit exhaust flow. In general, this angle is approximately an acute angle. However, in other embodiments, the radiator 163 can be substantially parallel with the horizontal axis of the frame 103 or the ground to provide the rear portion of the utility vehicle 100 with a lower profile. In still other embodiments, the radiator 163 can be arranged along a substantially vertical axis. Such a configuration could increase the usable space for the containers 154 or other features of the rear cover 121.

The hydraulic fan assembly 169 includes a cooling fan 172 surrounded by a fan shroud 175 that is located between the engine 116 and the radiator 163. The cooling fan 172 is powered by a hydraulic fan motor 178. The cooling fan 172 draws air from outside of the utility vehicle 100 through the radiator screen 151 and across the engine to provide additional cooling. Air drawn in by the cooling fan 172 can also be used to cool oil and other fluids. By providing the cooling assembly 148 on an upper portion or an upward facing surface of the utility vehicle 100, dust and other debris that can be kicked up by the front and rear wheel assemblies 106, 109 is less likely to be drawn into the cooling assembly 148 through the radiator screen 151. This can reduce wear on the cooling assembly 148 and help to maintain the cooling efficiency of the cooling assembly 148.

The cooling assembly 148 is pre-assembled into a modular unit that is then mounted to the utility vehicle. A pair of opposed mounting brackets 170 including cooling assembly mounting portions 170a and vehicle mounting portions 170b are provided for mounting the cooling assembly 148 to the utility vehicle 100. The radiator 163, the hydraulic oil cooler 166 and the shroud 175 are mounted to the cooling assembly mounting portions 170a to form a first sub-assembly. The hydraulic fan motor 178 and the fan 172 are mounted to a lower mounting bracket 177 to form a second sub-assembly. The second sub-assembly is assembled with the first sub-assembly to form a unit. The unit is installed to the utility vehicle 100 by mounting the vehicle mounting portions 170b to the utility vehicle 100.

Returning to FIG. 1, the rear interface mount 124 is integrally formed, welded or otherwise rigidly mounted to the frame 103 of the utility vehicle 100, thereby permitting the rear interface mount 124 to carry heavy loads. The rear interface mount 124 is adapted to releasably attach various types of work mechanisms or attachments to the utility vehicle 100 for use in a variety of work applications. The rear interface mount 124 provides versatility in attaching different types of attachments by including a plurality of interface apertures 180. The rear interface mount 124 includes a front mount portion 183 and a rear mount portion 186 spaced apart from one another. A pair of side mount portions 189 join the front and rear mount portions 183, 186 to form a generally box-shaped configuration. Lateral mount portions 192 are mounted to the frame 103 on each side of the side mount portions 189.

The rear interface mount 124 includes a plurality of interface apertures 180 having various diameters and relative positions. The interface apertures 180 can receive bolts or other attachment mechanisms (not shown) extending horizontally, vertically, longitudinally (i.e., through interface apertures 180 in the front and/or rear mount portions) and/or laterally (i.e., extending through the side mount portions 189). Various combinations of interface apertures 180 can be used to mount a particular work mechanism to the rear interface mount 124. Thus, while the front attachment plate 145 can provide for releasably attaching a variety of attachments having a standardized interface while the rear interface mount 124 can receive a variety of work mechanisms having varying interfaces.

Figure 11:
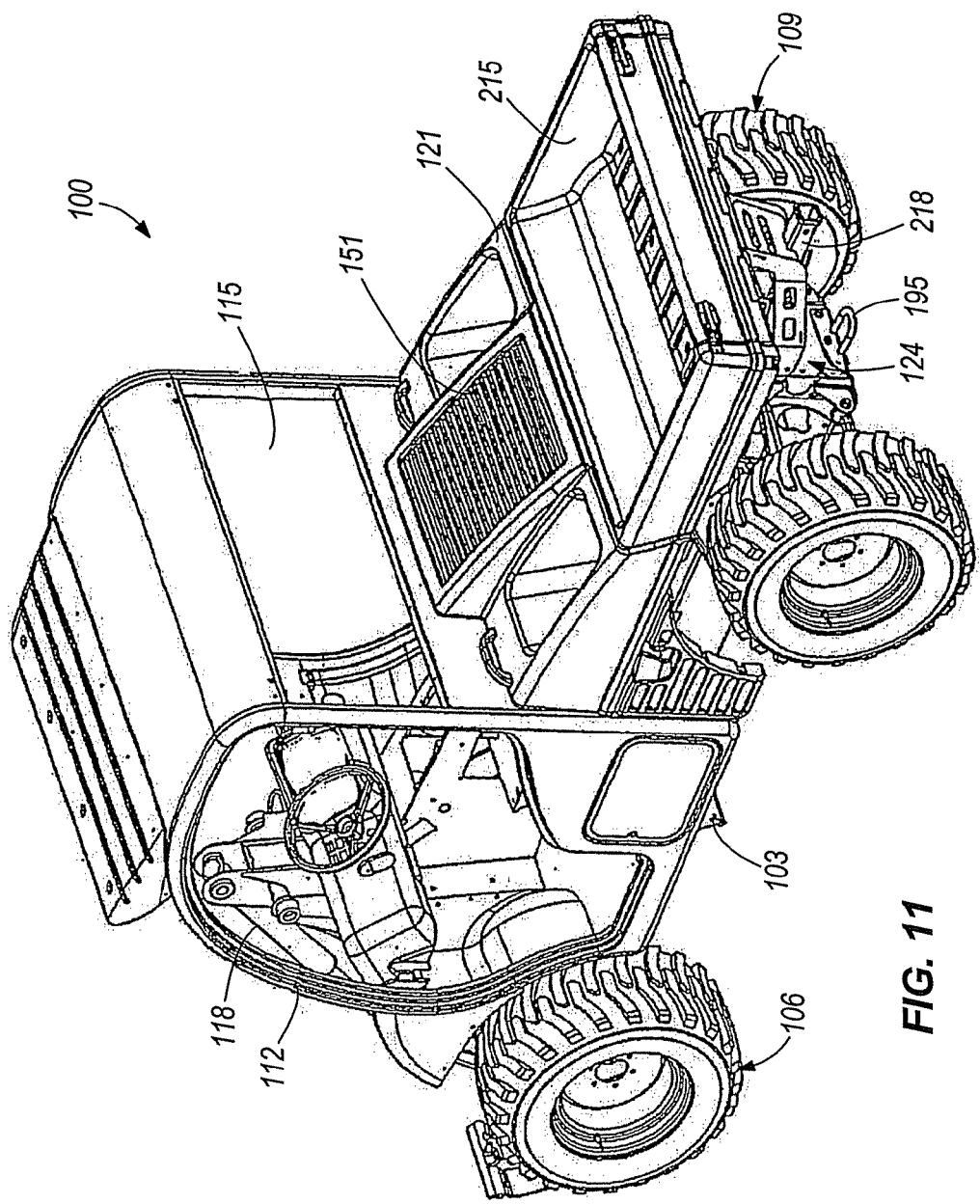
FIG. 11 illustrates a perspective view of the utility vehicle of FIG. 1 including a box attached to the rear interface mount.
Figure 12:
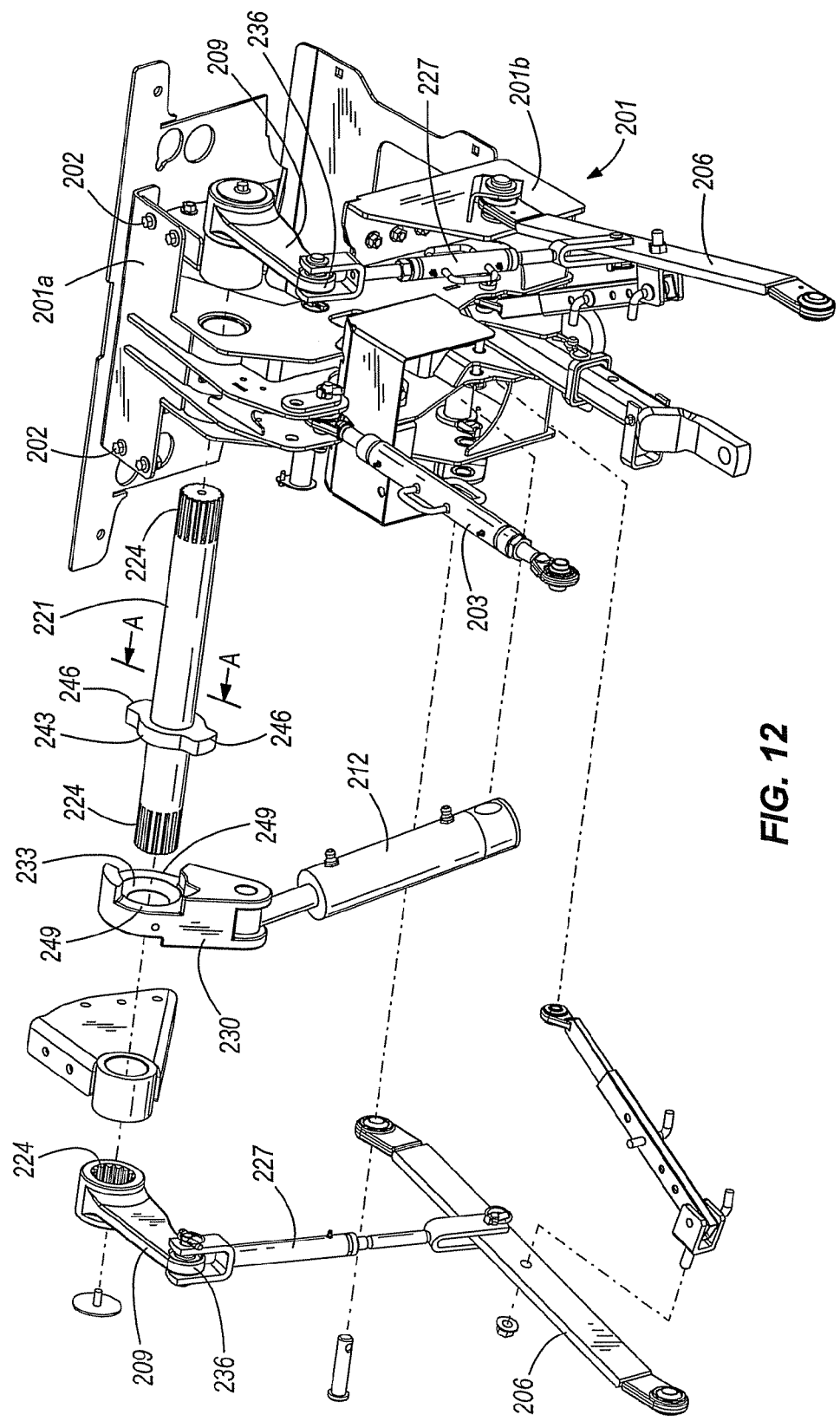
FIG. 12 illustrates an exploded perspective view of the three-point hitch assembly of FIG. 10.

As illustrated in FIG. 5, the rear interface mount 124 can attach a work mechanism such as a towing hook 195 using a portion of the plurality of the interface apertures. In addition, the rear interface mount 124 can attach a hitch receiver (not shown). However, the versatility of the rear interface mount 124 permits more complicated work mechanisms to be attached to the utility vehicle 100. Some of these more complicated work mechanisms are illustrated in FIGS. 10-12.

Figure 9:
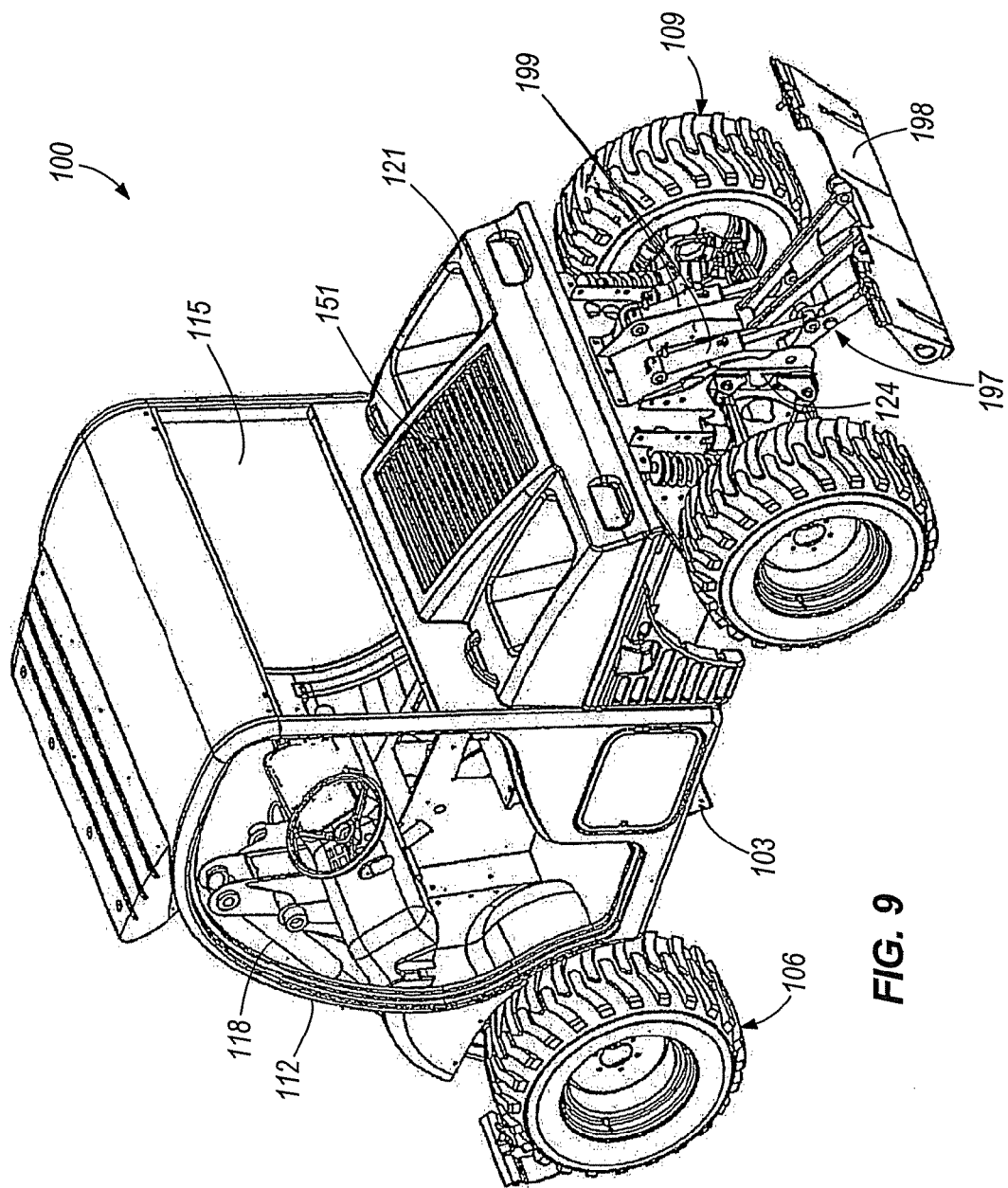
FIG. 9 illustrates a perspective view of the utility vehicle of FIG. 1 including a rear arm assembly having a tool interface plate attached to the rear interface mount.

FIG. 9 shows a rear arm assembly 197 mounted to the rear interface mount 124. The rear arm assembly 197 is removably attached to the rear interface mount 124 with a plurality of bolts. Like the attachment arm assembly 118 which is supported on the front of the utility vehicle 100, the remote end of the rear arm assembly 197 can be connected to a tool interface plate 198 that provides an interface plate for attaching to various tool (not shown). Such tools can include blades, buckets, grapples, brooms, augers, pallet forks, etc. Movement of the rear arm assembly 197 is effected through the use of hydraulic or other types of mechanical or electrical actuators 199, such as actuators, which can receive power from the engine 116. Therefore, additional connectors can be implemented to connect both hydraulic and electrical actuators to the engine 116.

Figure 10:
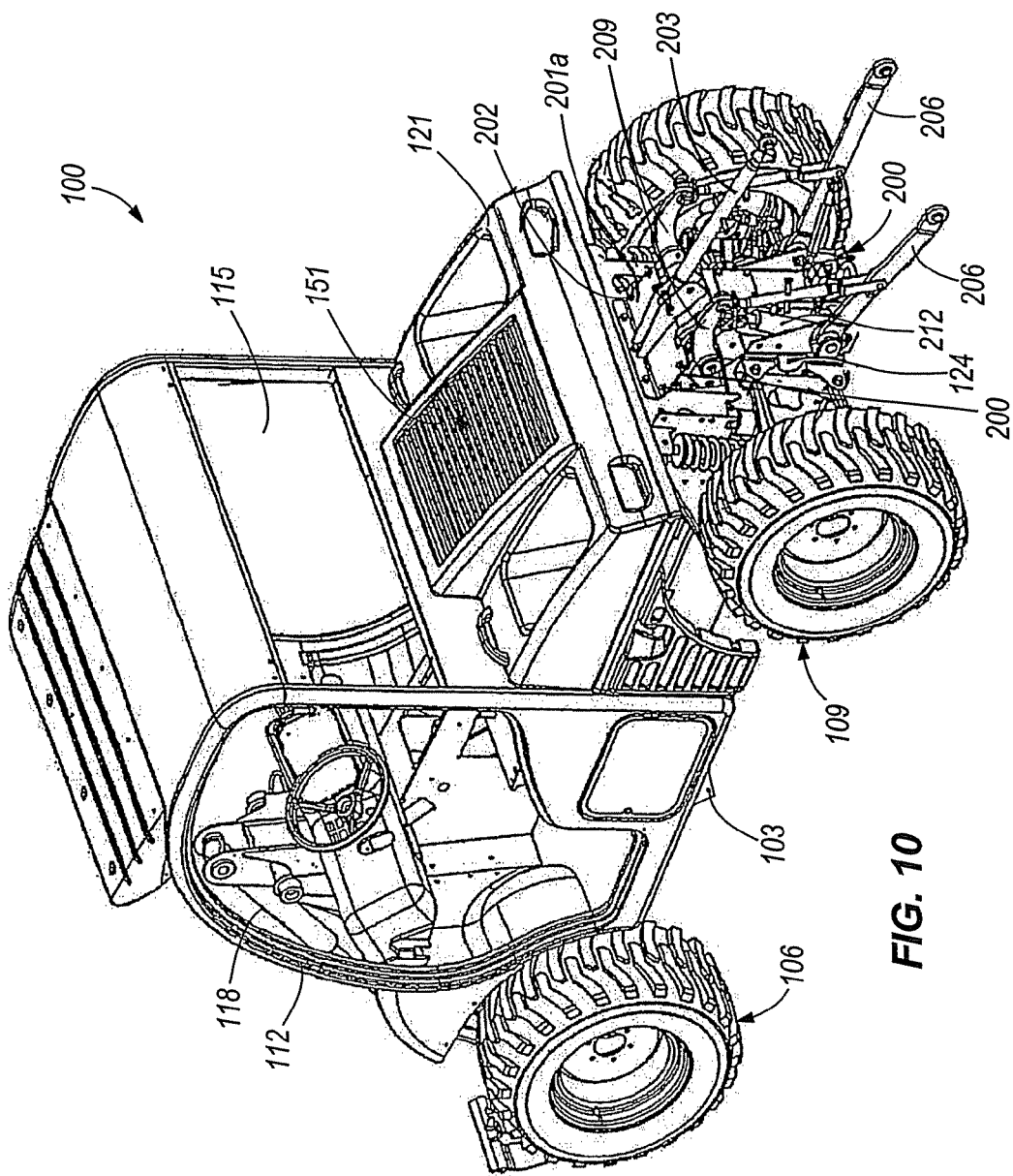
FIG. 10 illustrates a perspective view of the utility vehicle of FIG. 1 including a three point hitch assembly attached to the rear interface mount.

FIG. 10 shows a modular three-point hitch assembly 200 mounted to the rear interface mount 124. Similar to the rear arm assembly 197 shown in FIG. 9, the three-point hitch assembly 200 includes an interface portion 201 for removably attaching the three-point hitch assembly 200 to the rear interface mount 124 with bolts 202. The interface portion 201 can include one or more plate portions; in the illustrated embodiment, the interface portion 201 includes an upper plate portion 201a and a lower plate portion 201b (hidden from view in FIG. 10).

The three-point hitch assembly 200 includes an upper link 203 and a pair of lower links 206 having ends that are coupleable to various tools, including ground engaging tools such as a plow, a blade, an auger, a cultivator, etc, as well as pallet forks, bale spears, rotary cutters, mowers, etc. (not shown). The three-point hitch assembly 200 provides modularity to the utility vehicle 100. By modularity, it is meant that the three-point hitch assembly 200 provides a single package or unit that can be installed on the utility vehicle 100 independently of other components. The three-point hitch assembly 200 includes a pair of lift arms 209 fixed to a rock shaft 221 (hidden from view in FIG. 10). Movement of the lift arms 209 is effected through the use of a double acting hydraulic actuator 212. In other embodiments, other types of mechanical or electrical double acting actuators that can receive hydraulic fluid or power from the engine are used to effect movement of the lift arms.

The double acting hydraulic actuator 212 provides the ability for the upper link 203 and the lower links 206 to lift. The double acting hydraulic actuator 212 also provides the ability to exert a downward force on the upper link 203 and the lower links 206. Such a downward force could be used to apply a downward pressure on various kinds of ground engaging tools. In one example, if the ground engaging tool is a blade, the double acting hydraulic actuator 212 can apply pressure on the ground to scrape hard to remove ice. Likewise, if the ground engaging tool is an auger, the double acting hydraulic actuator 212 can apply pressure on the ground to dig a hole. In other embodiments, however, the double acting hydraulic actuator 212 can be replaced with a single acting hydraulic actuator.

FIG. 11 shows a box 215 mounted on the rear interface mount 124. The box 215 can also include a receiver hitch 218. The box 215 is supported above the rear wheel assembly 109 and behind the rear cover 121. The box 215 is mounted to a top portion (hidden from view in FIG. 11) of the rear interface mount 124, including the lateral mount portions 192. As illustrated, the box 215 does not require the use of space on the rear interface mount 124 that is otherwise needed for attaching other types of work mechanisms, such as the front and side mount portions 183, 189. Therefore, the utility vehicle 100 can attach the box 215 on the rear interface mount 124 in combination with a work mechanism mounted on other space on the rear interface mount 124. As illustrated, the rear interface mount 124 can attach the towing hook 195 in combination with the box 215 and receiver hitch 218.

Other configurations include attaching a rear arm assembly having a tool interface plate in combination with the box 215 and attaching the three point hitch assembly 200 in combination with the box 215 (not shown). Although mounting the work mechanisms for these examples is permitted, some or all of the operability of the work mechanism may be impaired by the box 215. For example, the box 215 may block lifting or pivoting of the work mechanism. Thus, although the work mechanism may not be fully operable in combination with the box 215, the user would be able to attach the box 215 without having to detach the work mechanism. In other embodiments, the configuration of the box 215 can be adapted to permit operation of the work mechanism (not shown). For example, the box 215 may have a recessed portion to accommodate lifting or pivoting of the work mechanism.

The box 215 can be pivotally coupled to the rear interface mount 124 to permit tilting the box 215 for emptying the box 215. In some embodiments 215, the box is manually tiltable. In other embodiments, tilting is effected by hydraulic actuators or other mechanical or electrical actuators receiving power from the engine 116. Box tilting may be inhibited by the work mechanism mounted to the rear interface mount 124 below the box 215.

FIG. 12 illustrates the three-point hitch assembly 200 according to an embodiment of the invention. The three-point hitch assembly 200 is adapted to mount to the rear interface mount 124 as previously discussed. In other embodiments, the three-point hitch assembly 200 can be mounted to other types of work or utility vehicles and not just for the purposes of modularity as discussed above. The three-point hitch assembly 200 include the upper link 203, a pair of lower links 206, a pair of lift arms 209, a rock shaft 221 and a hydraulic actuator 212. In other embodiments, the three-point hitch assembly 200 is provided with other types of mechanical and electrical actuators which can receive hydraulic fluid or power from the engine 116 and which can be used in place of the hydraulic actuator 212.

Each lift arm 209 is coupled to the rock shaft 221 with splines 224. The three-point hitch assembly 200 also includes a pair of leveling links 227 that couple each lower link 206 to each lift arm 209, as well as an actuator arm 230. The actuator arm 230 is coupled to the hydraulic actuator 212 includes a receiving aperture 233 at the end opposite the end attached to the actuator 212. The rock shaft 221 is adapted for insertion into the actuator arm 224 through the aperture 233. The end of the actuator arm 230 that includes the aperture 233 is free to rotate about the rock shaft 221.

The actuator 212 of the three-point hitch assembly 200 can be adapted for providing tilting power to the box 215. The lift arms 209 are detached from the leveling links 227 and pivoted about the rock shaft 221 in a clockwise direction (i.e., upwards). The repositioned lift arms 209 are coupled to the box 215 at pivot 236. When the actuator 212 is engaged, the lift arm 209 exert an upwardly directed force on the box 215, raising the end of the box 215 and tilting the box 215.

Figure 13:
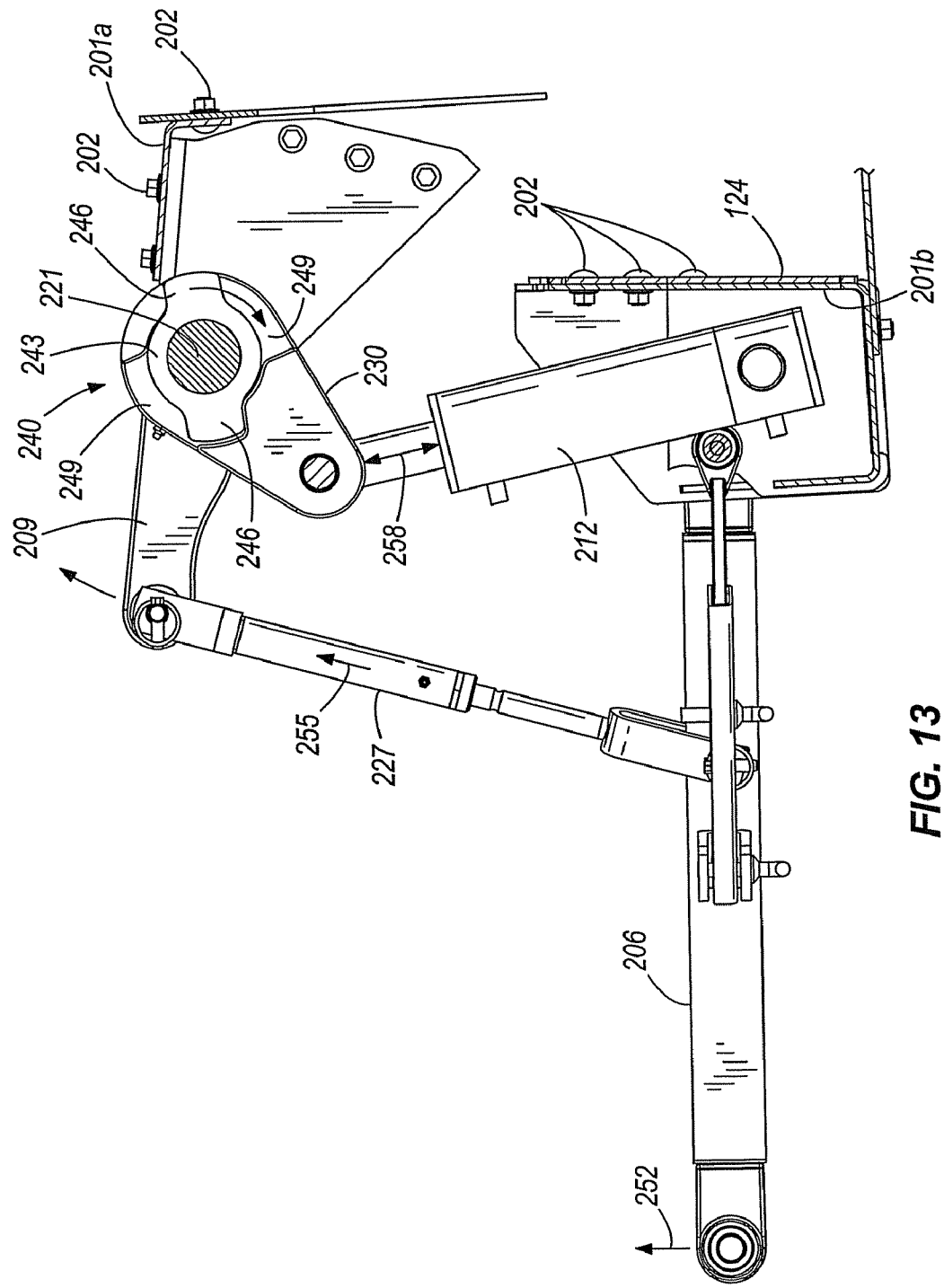
FIG. 13 illustrates a cut-away side view of the three-point hitch assembly of FIG. 12 taken along line A-A.
Figure 14:
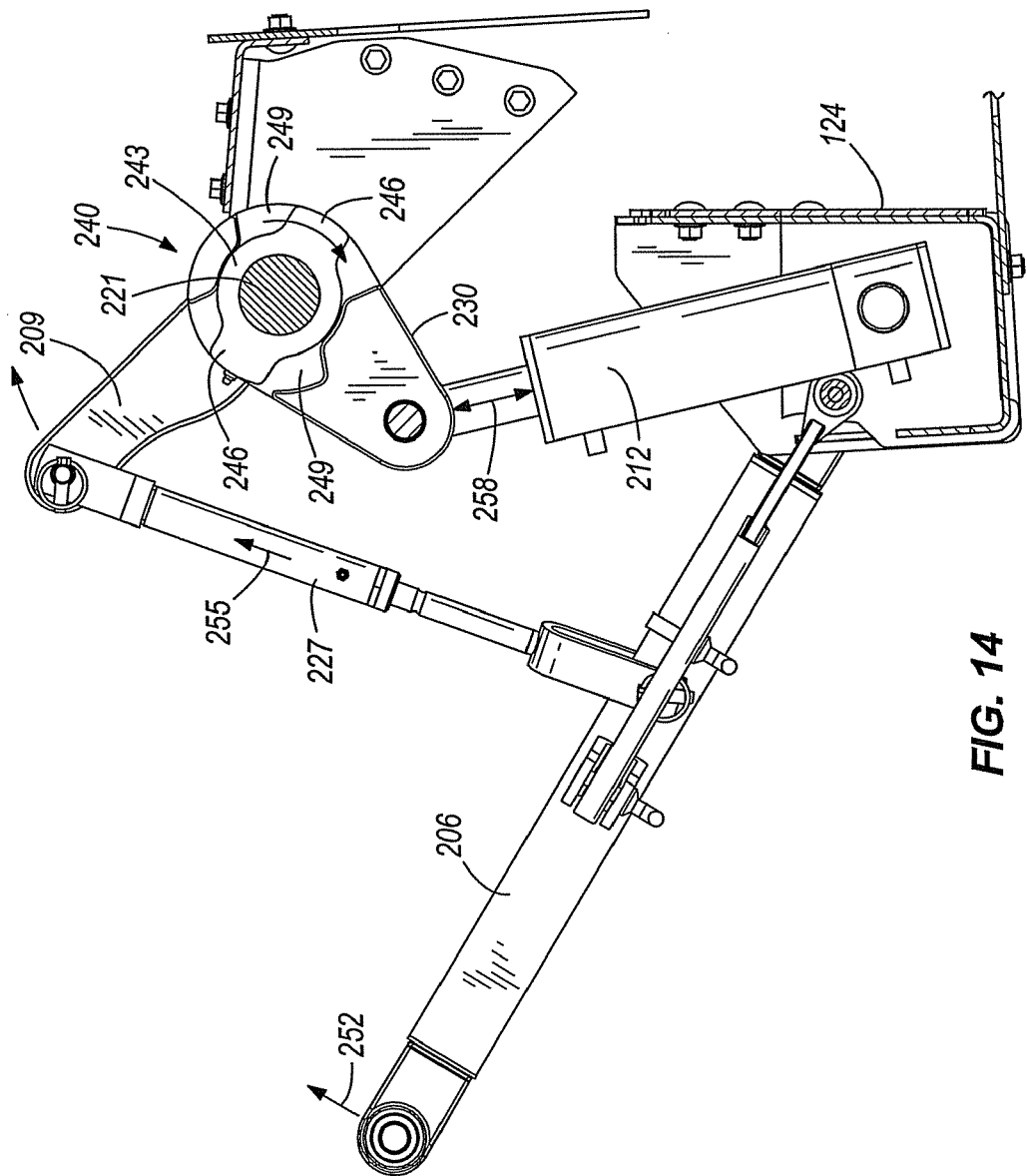
FIG. 14 illustrates the three-point hitch assembly of FIG. 13 with the lower links raised.

As shown in FIGS. 13-14, the three-point hitch assembly 200 includes a float mechanism 240. The float mechanism 240 includes a float block 243 with first and second protrusions 246. The float block 243 is fixed to the rock shaft 221 and rotates with the rock shaft 221. The float mechanism 240 also includes a pair of open slots 249 in the actuator arm 230. In the illustrated embodiment, the slots 249 are on opposite sides of the rock shaft 221. Each protrusion 246 is received within one of the slots 249. The float mechanism 240 allows the pair of lower links 206 to move in an upward direction without affecting the disposition of the hydraulic actuator 212. For example, if a tool attached to the ends of the lower links 206 were to hit a rock or other ground abnormality, as illustrated in FIG. 14, the lower links 206 will move upwardly as indicated by arrow 252 and therefore provide an upward force on the pair of lift arms 209 that is equivalent to a desire for lift arms 209 to rotate in a clockwise direction as indicated by arrow 255. The lift arms 209 are fixed to the rock shaft 221 and therefore cause the rock shaft 221 to rotate. The rock shaft 221 is free to rotate relative to the actuator arm 230 within each slot 249. The rotation of the protrusions 246 within the slots 249 allow the pair of lower links 206 to move in a vertical distance without affecting the disposition of the hydraulic actuator 212 (note the position of the actuator 212, as indicated by arrow 258, is unchanged in FIGS. 13 and 14). Float mechanism 240 aides in attaching a work tool to the three-point hitch assembly 200 as well as implementing a float as required by most three-point hitch systems for safety reasons.

If the rotation of the protrusions 246 is sufficient (i.e. the lower links 206 move a sufficient vertical distance) the protrusions 246 bottom out in the slots 249, allowing force to be transferred from the rock shaft 221 and actuator arm 230 to the hydraulic actuator 212. However, the work tool is unlikely to be vertically displaced to the extent necessary to rotate the protrusions 246 to the end of the slots 249. The float mechanism 240 can therefore be considered a "free" float mechanism.

Figure 15:
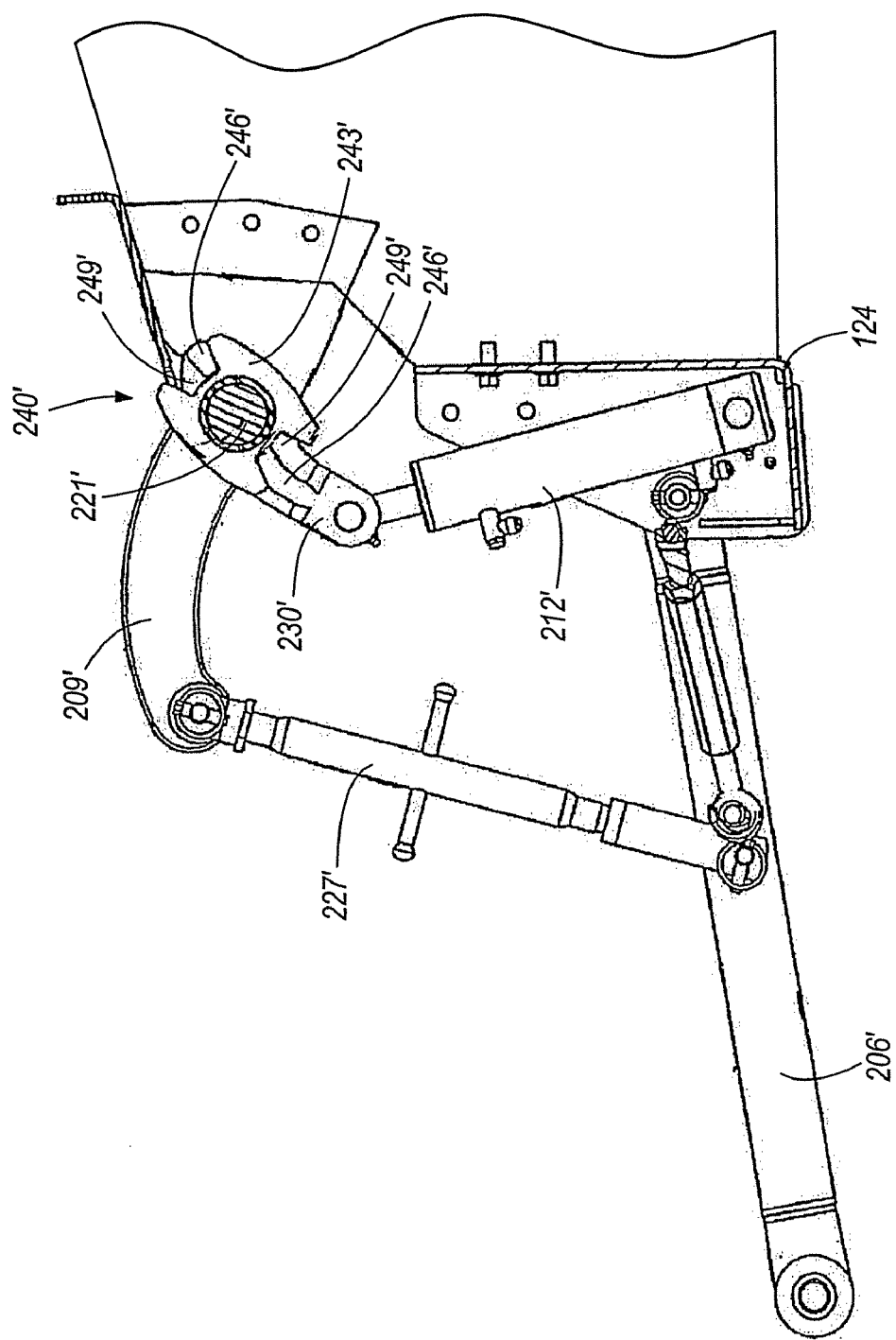
FIG. 15 illustrates a sectional view of a three-point hitch assembly according to another embodiment of the invention.

In another embodiment, the three-point hitch assembly 200 includes limited float mechanism in place of the free float mechanism described above. FIG. 15 illustrates a three-point hitch 200' having a limited float mechanism 240'. The three-point hitch assembly 200' is generally similar to the three-point hitch assembly 200 shown in FIGS. 12-14, and like parts are given like numbering in the _____'series.

The limited float mechanism 240' is similar in many respects to the free float mechanism 240. However, the slots 249' are on the rock shaft 221' and the protrusions 246' are on the actuator arm 230'. In addition, the slots 249' are smaller relative to the protrusions 246'. The protrusions 246' will tend to bottom out in the slots 249' when the lower links 206' move a predetermined vertical distance.

The limited float mechanism 240' facilitates exerting a downward force on the work tool. This is accomplished by retracting the actuator 212' so as to rotate the actuator arm 230' relative to the rock shaft 221'. As the slots 249' bottom out against the protrusions 246', the force exerted by the actuator 212' is transferred to the rock shaft 221', which causes a downward force to be exerted on the work tool.

Thus, the invention provides, among other things, a multi-configuration utility vehicle. Various features and advantages of the invention are set forth in the following claims.

What is claimed is:

1. A three-point hitch assembly for a utility vehicle, the three-point hitch assembly comprising:
   an upper link;
   a pair of lift arms;
   a pair of lower links coupled to the lift arms;
   a rock shaft to which each of the lift arms is fixedly connected;
   a hydraulic cylinder having a rod and a body;
   an actuator arm coupling the rod end of the hydraulic cylinder to the rock shaft to transfer a force from the hydraulic cylinder to rotate the rock shaft and thereby lift the pair of lift arms, wherein the actuator arm includes a first end portion coupled to the rod of the hydraulic cylinder and a second end portion having an aperture therethrough, the rock shaft being rotatably received within the aperture; and
   a float mechanism including a float block fixed to the rock shaft, wherein the float mechanism includes a slot in one of the float block and the actuator arm and a protrusion for engaging the other of the float block and the actuator arm to permit the rock shaft limited rotational movement with respect to the actuator arm.

2. The three-point hitch assembly of claim 1, wherein the protrusion is on the float block and the slot is in the actuator arm such that the protrusion is moveable within the slot to permit limited rotation of the rock shaft, the aperture extending between a first side of the actuator arm that is adjacent to the float block to a second side of the actuator arm and the slot being located in proximity to an outer diameter of the aperture on the first side of the actuator arm.

3. The three-point hitch assembly of claim 1, wherein the protrusion is on the actuator arm and the slot is in the float block such that the slot is moveable relative to the protrusion to permit limited rotation of the rock shaft, the aperture extending between a first side of the actuator that is adjacent to the float block to a second side of the actuator arm and the protrusion being located in proximity to an outer diameter of the aperture on the first side of the actuator arm.

4. The three-point hitch assembly of claim 2, wherein the protrusion on the float block includes a pair of opposed protrusions and the slot in the actuator arm includes a pair of opposed slots.

5. The three-point hitch assembly of claim 1, wherein the float mechanism inhibits transfer of force from the rock shaft to the hydraulic actuator for a predetermined vertical displacement of the lower links and permits transfer of force from the rock shaft to the hydraulic actuator beyond the predetermined vertical displacement of the lower links.

6. The three-point hitch assembly of claim 5, wherein the protrusion bottoms out in the slot to permit transfer of force from the rock shaft to the hydraulic actuator beyond the predetermined vertical displacement of the lower links.

7. The three-point hitch assembly of claim 1, wherein the slot is open.

8. The three-point hitch assembly of claim 1, further comprising an interface portion for removably attaching the three-point hitch assembly to an interface mount of a utility vehicle.

9. The three-point hitch assembly of claim 8, wherein the interface portion includes apertures for receiving bolts for mounting the three-point hitch assembly to the interface mount.

10. A three-point hitch assembly for a utility vehicle, the three-point hitch assembly comprising:
   an upper link;
   a pair of lift arms;
   a pair of lower links coupled to the lift arms;
   a rock shaft to which each of the lift arms is fixedly connected;
   a hydraulic cylinder;
   an actuator arm fixed to the hydraulic cylinder at a first end and having an actuator arm aperture located at an opposing second end and extending between a first side and a second side of the actuator arm, the actuator arm rotatably coupled to the rock shaft through the actuator arm aperture and capable of transferring a force from the hydraulic cylinder to rotate the rock shaft and thereby lift the pair of lift arms, the actuator arm further including a pair of recesses located opposite each other about an outer diameter of the actuator arm aperture and extending from the first side of the actuator arm towards the second side of the actuator; and
   a float block fixed along the rock shaft through a float block aperture and positioned adjacent to the first side of the actuator arm, wherein the float block includes a pair of protrusions located opposite each other about an outer diameter of the float block aperture, wherein when the rock shaft rotationally moves, the pair of opposing protrusions are free to move within the corresponding pair of opposing recesses of the actuator arm to permit rotational movement of the rock shaft with respect to the actuator arm.

11. The three-point hitch assembly of claim 10, wherein each of the pair of lift arms are fixed to each of the ends of the rock shaft.

12. The three-point hitch assembly of claim 10, wherein the upper link has an end configured to coupled to the variety of different tools.

13. The three-point hitch assembly of claim 11, wherein the pair of lower links are coupled to the lift arms and have ends configured to couple to the variety of different tools.

14. The three-point hitch assembly of claim 10, further comprising an interface portion for removably attaching the three-point hitch assembly to an interface mount of a utility vehicle.

15. The three-point hitch assembly of claim 14, wherein the interface portion includes apertures for receiving bolts for mounting the three-point hitch assembly to the interface mount.

16. A three-point hitch assembly for a utility vehicle, the three-point hitch assembly comprising:
   an upper link;
   a pair of lift arms;
   a pair of lower links coupled to the lift arms;
   a rock shaft, wherein each of the lower links is fixedly connected to the lift arms;
   a hydraulic cylinder;
   an actuator arm fixed to the hydraulic cylinder at a first end and having an actuator arm aperture located at an opposing second end and extending between a first side and a second side of the actuator arm, the actuator arm rotatably coupled to the rock shaft through the actuator arm aperture and capable of transferring a force from the hydraulic cylinder to rotate the rock shaft and thereby lift the pair of lift arms, the actuator arm further including a pair of protrusions located opposite each other about an outer diameter of the actuator arm aperture and on the first side of the actuator arm; and
   a float block fixed along the rock shaft through a float block aperture and positioned adjacent to the first side of the actuator arm, wherein the float block includes a pair of recesses located opposite each other about an outer diameter of the float block aperture and extending from an outer edge of the float block towards the float block aperture, wherein when the rock shaft rotationally moves, the pair of opposing recesses of the float block are free to move relative to the corresponding pair of opposing protrusions of the actuator arm to permit rotational movement of the rock shaft with respect to the actuator arm.

17. The three-point hitch assembly of claim 16, wherein each of the pair of lift arms are fixed to each of the ends of the rock shaft.

18. The three-point hitch assembly of claim 16, wherein the upper link has an end configured to coupled to a variety of different tools.

19. The three-point hitch assembly of claim 18, wherein the pair of lower links are coupled to the lift arms and have ends configured to couple to the variety of different tools.

20. The three-point hitch assembly of claim 16, further comprising an interface portion for removably attaching the three-point hitch assembly to an interface mount of a utility vehicle.

* * * * *